(12) United States Patent
Arnold (10) Patent No.: US 9,163,533 B2
(45) Date of Patent: Oct. 20, 2015

(54) CAMSHAFT ADJUSTER

(71) Applicant: Schaeffler Technologies AG & Co. KG, Herzogenaurach (DE)

(72) Inventor: Mario Arnold, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 21 days.

(21) Appl. No.: 13/732,591

(22) Filed: Jan. 2, 2013

(65) Prior Publication Data

US 2013/0174798 A1   Jul. 11, 2013

(30) Foreign Application Priority Data

Jan. 5, 2012   (DE) .................. 10 2012 200 099

(51) Int. Cl.
| | | |
|---|---|---|
| *F01L 1/34* | (2006.01) | |
| *F01L 1/356* | (2006.01) | |
| *B23P 11/00* | (2006.01) | |
| *F01L 1/344* | (2006.01) | |

(52) U.S. Cl.
CPC ............... *F01L 1/356* (2013.01); *B23P 11/00* (2013.01); *F01L 1/3442* (2013.01); *F01L 2001/34469* (2013.01); *F01L 2001/34483* (2013.01); *F01L 2103/00* (2013.01); *Y10T 29/49863* (2015.01)

(58) Field of Classification Search
CPC ................... F01L 1/3442; F01L 1/356; F01L 2001/34483; Y10T 29/49863
USPC ............................................. 123/90.15, 90.17
See application file for complete search history.

(56) References Cited

U.S. PATENT DOCUMENTS

| | | | | |
|---|---|---|---|---|
| 8,113,159 | B2 * | 2/2012 | Myers et al. ............... | 123/90.17 |
| 8,434,438 | B2 * | 5/2013 | Weber et al. ............... | 123/90.17 |
| 2003/0110885 | A1 | 6/2003 | Beutler | |

FOREIGN PATENT DOCUMENTS

| | | |
|---|---|---|
| DE | 19830100 | 1/2000 |
| DE | 102005003414 | 7/2006 |
| DE | 102007020524 | 11/2008 |
| DE | 102008019745 | 10/2009 |
| DE | 102008032031 | 1/2010 |

* cited by examiner

*Primary Examiner* — Ching Chang
(74) *Attorney, Agent, or Firm* — Volpe and Koenig, P.C.

(57) ABSTRACT

A camshaft adjuster (1), which has a cover element (4), which has at least one deformation zone (7), which, when the cover element (4) is assembled with the input element (2) or the output element (3), is deformed in such a way that a preloading force acts, pressing the cover element (4) and the input element (2) or output element (3) against one another.

10 Claims, 5 Drawing Sheets

CAMSHAFT ADJUSTER

INCORPORATION BY REFERENCE

The following documents are incorporated herein by reference as if fully set forth: German Patent Application No. DE 102012200099.2, filed Jan. 5, 2012.

FIELD OF THE INVENTION

The invention relates to a camshaft adjuster.

BACKGROUND

Camshaft adjusters are used in internal combustion engines to vary the timing of the combustion chamber valves in order to be able to vary the phase relation between a crankshaft and a camshaft in a defined angular range between a maximum advanced and a maximum retarded position. Adapting the timing to the current load and engine speed reduces consumption and emissions. For this purpose, camshaft adjusters are integrated into a drive train via which a torque is transmitted from the crankshaft to the camshaft. This drive train can be designed as a belt, chain or gear drive, for example.

In the case of a hydraulic camshaft adjuster, the output element and the input element form one or more pairs of opposing pressure chambers, which can be supplied with hydraulic fluid. The input element and the output element are arranged coaxially. By filling and emptying individual pressure chambers, a relative motion between the input element and the output element is produced. The spring acting for rotation between the input element and the output element urges the input element in a preferential direction relative to the output element. This preferential direction can be the same as or opposed to the direction of rotation.

One type of hydraulic camshaft adjuster is the vane cell adjuster. Vane cell adjusters have a stator, a rotor and a drive wheel with external teeth. The rotor is designed as an output element, generally in a manner which allows it to be connected for conjoint rotation to the camshaft. The input element comprises the stator and the drive wheel. The stator and the drive wheel are connected to one another for this purpose. The rotor is arranged coaxially with the stator and within the stator. The rotor and the stator, with their radially extending vanes, define oppositely acting oil chambers, which can be supplied with oil pressure and allow a relative rotation between the stator and the rotor. The vanes are either formed integrally with the rotor or the stator or are arranged as "inserted vanes" in grooves provided for that purpose in the rotor or the stator. Moreover, vane cell adjusters have various sealing covers. The stator and the sealing covers are secured to one another by a plurality of screw connections.

Another type of hydraulic camshaft adjuster is the axial piston adjuster. In this case, a sliding element is moved axially via oil pressure, producing a relative rotation between an input element and an output element by way of helical teeth.

Another type of camshaft adjuster is the electromechanical camshaft adjuster, which has a three-shaft mechanism (e.g. a planetary gear). In this case, one of the shafts forms the input element and a second shaft forms the output element. Via the third shaft, rotational energy can be fed to or removed from the system by a positioning device, e.g. an electric motor or a brake. A spring can be provided in addition, assisting or reversing the relative rotation between the input element and the output element.

DE 10 2007 020 524 A1 discloses a hydraulic camshaft adjuster of the vane-cell construction. For axial delimitation of the working chambers, this camshaft adjuster has two side covers or thrust washers, which are connected to the internal wheel and the camshaft by a screwed connection. For sealing, first and second sealing elements are provided and arranged between the respective thrust washer and the drive wheel, together with the integrally formed sleeve portion.

DE 198 30 100 A1 discloses a camshaft adjusting device having an impeller. The pressure chambers are sealed off by a sealing cage, which is also intended, inter alia, to seal off the pressure chambers with respect to the side walls of the drive wheel in a pressure tight manner.

DE 10 2008 019 745 A1 discloses a hydraulic camshaft adjuster, the housing of which is sealed off with respect to side covers arranged on the axial end faces thereof by second, O-ring-type sealing means, thus ensuring that no leakage occurs at the joint.

SUMMARY

It is the object of the invention to provide a camshaft adjuster which is sealed off in a particularly reliable manner from the environment.

This objective is met according to the invention.

A camshaft adjuster according to the invention has an input element and an output element, wherein the input element and the output element are arranged in such a way that they can be rotated relative to one another. The camshaft adjuster further has a cover element, wherein the cover element has a fastening point and is fastened by the latter to the input element or to the output element, using a fastener, achieves the object by having, on the cover element, a deformation zone outside the fastening point thereof, said deformation zone being deformed in such a way that there is an axial preloading force between the cover element and the input element or output element fastened to the cover element.

Particularly in the case of hydraulic camshaft adjusters, the formation of a reliable seal for the camshaft adjuster is necessary. Both the type of hydraulic camshaft adjusters of vane cell construction, which have an input element and an output element, each forming a plurality of vanes, wherein the vanes divide oppositely acting working chambers, and the working chambers can be subjected to pressure by hydraulic fluid in order to achieve a relative rotation between the input element and the output element about the axis of rotation of the camshaft adjuster, and the type of hydraulic camshaft adjusters of axial piston construction, in which a sliding element is moved axially by hydraulic fluid, causing a relative rotation between an input element and an output element, are areas of application of the invention for preventing hydraulic fluid from getting into the environment.

A further distinction is made between belt-type adjusters and chain-type adjusters. The difference resides in the driving device of the input element. In the case of belt-type adjusters, the input element is driven by a belt while, in the case of chain-type adjusters, this is accomplished by a chain. In addition, mention should also be made of those camshaft adjusters in which the input element is driven by a gear mechanism. As a much more exotic option, a drive involving other types of mechanism, e.g. a friction wheel mechanism, is conceivable.

The achievement according to the invention is that much better sealing of the working chambers with respect to the environment is attained, particularly in the case of hydraulic camshaft adjusters, than with the prior art as hitherto taught. According to the invention, the fastening of the cover element according to the invention to the input element or output element results in a preloading force which forces the cover element away from the respectively connected element. This preloading force counteracts the forces arising from the hydraulic fluid pressure peaks in the working chambers. The forces are preferably mutually opposed. In the ideal case, the forces which occur when the hydraulic fluid pressure peaks arise cancel each other out, but it is within the scope of the invention for the preloading force to be at least greater than the force of the hydraulic fluid pressure peaks. Thus, these hydraulic fluid pressure peaks can no longer bend the cover element, and the cover element and the respective element connected firmly thereto remain in mutual contact, preferably surface contact. The contact at the joint between the two elements connected firmly to one another is maintained and leakage is thereby significantly minimized.

Nonpositive connecting elements, in particular screws, are preferably used as fasteners. As an alternative, positive connecting elements or connecting elements involving a material bond are conceivable. A combination of the connecting elements can likewise be provided.

The cover element has at least one fastening point and at least one deformation zone. The fastening point is provided for permanent or releasable fastening of the cover element to the input element or output element. The deformation zone is preferably formed integrally with the cover element and arranged outside the fastening point. The deformation zone is such that the cover element is selectively deformed in this zone as an existing individual component. This deformation zone has a clear axial offset with respect to the region of the fastening point. The deformation zone is of elastic design to ensure that, after the cover element is fastened, said deformation zone is supported on the input element or output element. Once the fastening has been accomplished by the fastener and assembly is thus complete, the axial offset of the deformation zone is ideally eliminated or overcome to a very large extent.

As an alternative, depending on the embodiment, an axial offset can remain as long as there is a preloading force between the cover element and the respectively connected element. Even in this case, the joints remain in surface contact with one another, especially when hydraulic fluid pressure peaks arise, and improve sealing with respect to the environment.

The deformation zone can be designed as a groove, bead, depression, tab or the like as long as elastic behavior, preferably resulting from bending stress with a lever arm between the fastening point and the defined contact point of the deformation zone, which is initially supported on the input element or output element during assembly, is obtained.

The spring-like behavior is characterized by a spring constant and an absolute change in length. A change in length in the wall thickness of the fastening point due to compression of the material of the cover element by a screw, for example, is not according to the invention. Especially in the case of small wall thicknesses, this effect is negligibly small and furthermore does not exhibit the action according to the invention of forming a preloading force which can actively and effectively counteract the hydraulic fluid pressure on the cover element from the working chambers. The preloading force according to the invention is intended to ensure that contact in the joints between the cover element and the input element or output element, in particular around the working chamber, is maintained and is not lost, especially when there is a hydraulic fluid pressure prevailing in the working chamber.

As an alternative, the elastic, spring-like behavior can arise from a pressure stress instead of a bending stress.

Positive and nonpositive connecting elements, such as screws, pins, rivets, hooks, split-pins or possibly even material bonding techniques such as welding, soldering, adhesive bonding are suitable as fasteners. A mixture of positive, nonpositive and material connections is conceivable.

In one embodiment of the invention, the deformation zone is formed between a plurality of fastening points of the cover element, wherein the deformation zone is deformed in a spring-like manner and thus produces a preloading force. The advantageous result is that an optimum lever arm is advantageously formed between the fastening points and the deformation zone or the contact point thereof, and very largely symmetrical deformation of the deformation zone between the fastening points is achieved. The cover element thus makes very uniform contact with the input element or the output element.

In an advantageous embodiment, the deformation zone of the cover element is present at several points and is distributed uniformly over the circumference of the cover element. Through the formation of a plurality of deformation zones and hence a plurality of preloading forces acting in parallel and the spring constants thereof, a higher overall preloading force is advantageously achieved, pressing the cover element more reliably against the input element or output element and further minimizing leakage. The number of contact points of the cover element which support the preloading force is increased, and uniform contact between the cover element and the input element or output element is thereby achieved.

In another embodiment, the deformation zone is arranged around a fastening point. This arrangement is advantageous in order to make the loading of the fastening point symmetrical to reduce transverse forces and minimize transverse displacement. A transverse force on the fastening point would displace the latter transversely to the direction of the preloading force to such an extent that a shear force would act on the fastener and shorten the life of the latter. As an alternative, this can be counteracted by means of a correspondingly generous design of the fastening point, e.g. as a slotted hole combined with a fastening screw.

In an alternative embodiment, the cover element has integrally formed spring tabs to produce the preloading force. One advantageous possibility is for these tabs to be supported on the input element or output element outside the zone to be sealed off.

In an advantageous embodiment, the input element or the output element has a non-planar contact surface with the cover element, which deforms the cover element in such a way that the preloading force is present. The contact surface of the input element or output element with the cover element can be arched or corrugated or can have at least one raised portion of any shape which deforms the cover element after it is joined to the input element or output element. For this purpose, the contact surface of the cover element, in particular the deformation zone, is preferably of planar design. A contrary shape of the contact surface, in particular of the deformation zone of the cover element with respect to the contact surface of the input element or output element, is likewise conceivable. In this case, the spring travel of the cover element and the preloading force of the cover element are increased.

In a particularly advantageous embodiment, the cover element is made of sheet metal. Sheet metal or thin-walled material or, alternatively, even plastic has good spring properties and allows easy shaping in production. Sheet-metal parts have good deformation properties and thus allow the deformation zone to be made easily. A similar observation applies to the plastic design. Although plastic cover elements are produced by primary processing methods, a cover element of this kind can be provided with the deformation zones by subsequent forming processes. Materials such as light alloys, plastics and possibly also fiber-reinforced plastics or a mixture of various materials are preferred for use.

According to the invention, a method for achieving the object is proposed, in which the assembly of the camshaft adjuster according to the invention has the following sequence of steps:

the deformation zone is brought into contact with the input element or the output element, the fastener joins the cover element to the input element or output element, with the result that the deformation zone of the cover element is deformed, the deformation zone (7) has a preloading force during the joining operation, and, after assembly, the deformation zone is deformed in such a way that the cover element rests with a surface against the input element or output element, and the preloading force of the deformation zone presses the cover element and the input element or output element against one another, wherein the surface contact is maintained by the preloading force during the operation of the camshaft adjuster.

The surface contact at the joint is maintained by the preloading force according to the invention, in particular in the presence of a hydraulic fluid pressure in a working chamber.

In a preferred embodiment, a cover element of a camshaft adjuster according to the invention is proposed. As an advantageous possibility, the cover element itself can be provided selectively with specific designs of deformation zone according to requirements, e.g. those relating to leaktightness. A plurality of cover elements having the features according to the invention can be fastened to the camshaft adjuster, e.g. preferably on both axial ends of the camshaft adjuster. A cover element having the deformation zones according to the invention has a high dimensional stability.

In a particularly preferred embodiment of the invention, the cover element has almost the same wall thickness, and the deformation zone protrudes in the axial direction in the unassembled state of the cover element. The virtually constant wall thickness advantageously results in a cover element of high flexibility. The axial offset between the deformation zone and the region of the fastening point advantageously contributes to as much as 10% of the wall thickness. The axial offset is specified for the material used and the associated spring constant. As an alternative, the axial offset can amount to more than 10%, in particular in the case of extremely thin-walled cover elements. In the context of the invention, the decisive factor is that the preloading force should be greater than or at least equal to the force resulting from the hydraulic fluid pressure in the working chambers, in order to ensure that there is reliable sealing.

In a preferred embodiment of the invention, the cover element is a corrugated washer. A cover element designed in this way has the best dimensional stability combined with a low wall thickness for very good handling during assembly and transportation.

The arrangement according to the invention ensures extremely reliable sealing, especially against pressure peaks in the hydraulic fluid that occur during the operation of the camshaft adjuster.

BRIEF DESCRIPTION OF THE DRAWINGS

Illustrative embodiments of the invention are shown in the figures, where.

DETAILED DESCRIPTION OF THE PREFERRED EMBODIMENTS

A hydraulic camshaft adjuster 1 of having a vane-cell construction is shown by way of example in FIGS. 1 to 4, said adjuster having an input element 2 and an output element 3, which each form a plurality of vanes 11, 12, wherein the vanes 11, 12 divide off oppositely acting working chambers A, B, and the working chambers A, B can be subjected to pressure by hydraulic fluid in order to achieve a relative rotation between the input element 2 and the output element 3 about the axis of rotation 16 of the camshaft adjuster 1. The input element 2 has teeth 10 arranged for conjoint rotation. In this example, the teeth 10 are suitable for a chain drive known from the prior art (not shown specifically) and are formed integrally with the input element 2. FIG. 5 shows a cover element 4 of a camshaft adjuster 1 of this kind. The fundamental construction and operation of a camshaft adjuster 1 of this kind is sufficiently well known. The special features and details of this illustrative embodiment will be explored below.

Figure 1:
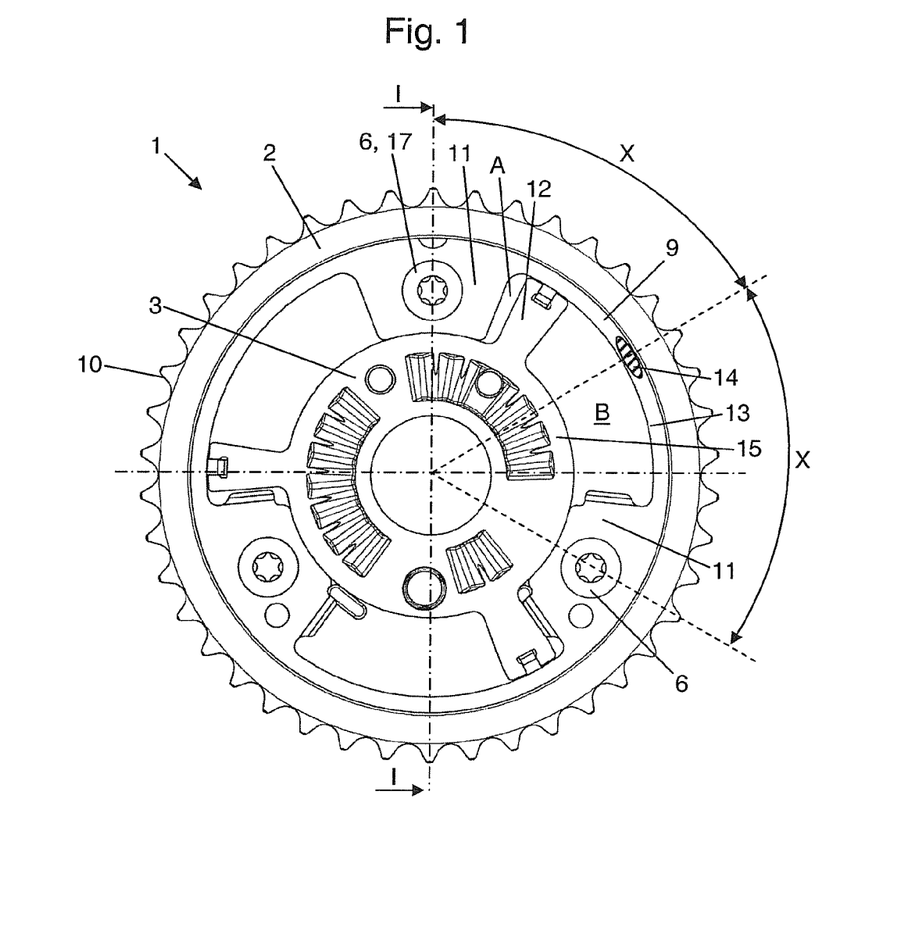
FIG. 1 shows a camshaft adjuster in a front view with the cover element omitted to allow a free view of its interior.

FIG. 1 shows a camshaft adjuster 1 in a front view with a cover element 4 omitted to allow a free view of its interior. The input element 2 has three vanes 11, which are arranged offset uniformly relative to one another at an angle of 120° in the circumferential direction. In corresponding fashion, the output element 3 likewise has three vanes 12. Each vane 11 of the input element 2 has a receptacle for a fastener 6, in this case a screw 17. The screw 17 is positioned very largely symmetrically with respect to the respective vane 11. Between each pair of vanes 11, the input element 2 forms an integral chamber wall 13 extending in the circumferential direction. Similarly, the output element 3 also forms a chamber wall 15 between each pair of vanes 12. The vanes 12 of the output element 3 can be formed separately from the output element 3 or integrally with the latter. Both chamber walls 13 and 15 delimit the working chambers A and B in the radial direction.

The contact point 14 for the abutment of the deformation zone 7 of the cover element 4 is provided on the angle bisector between two screws 17 or between two fastening points 5 of the cover element 4, this being shown schematically. The angle bisector forms the optimum lever arm between contact point 14 and fastening point 5. The contact point 14 is thus arranged very largely centrally on the chamber wall 13. The symmetry is advantageous for uniform deformation of the cover element 4. The contact point 14 is likewise arranged so as to occur three times at an angle of 120°, to give the uniform distribution in the circumferential direction. As a result, a "three-point abutment" is achieved when the cover element 4 makes contact with the contact surface 9 of the input element 2, and this abutment is extremely stable during the assembly process and results in uniform abutment of the cover element 4 on completion of assembly.

Figure 2:
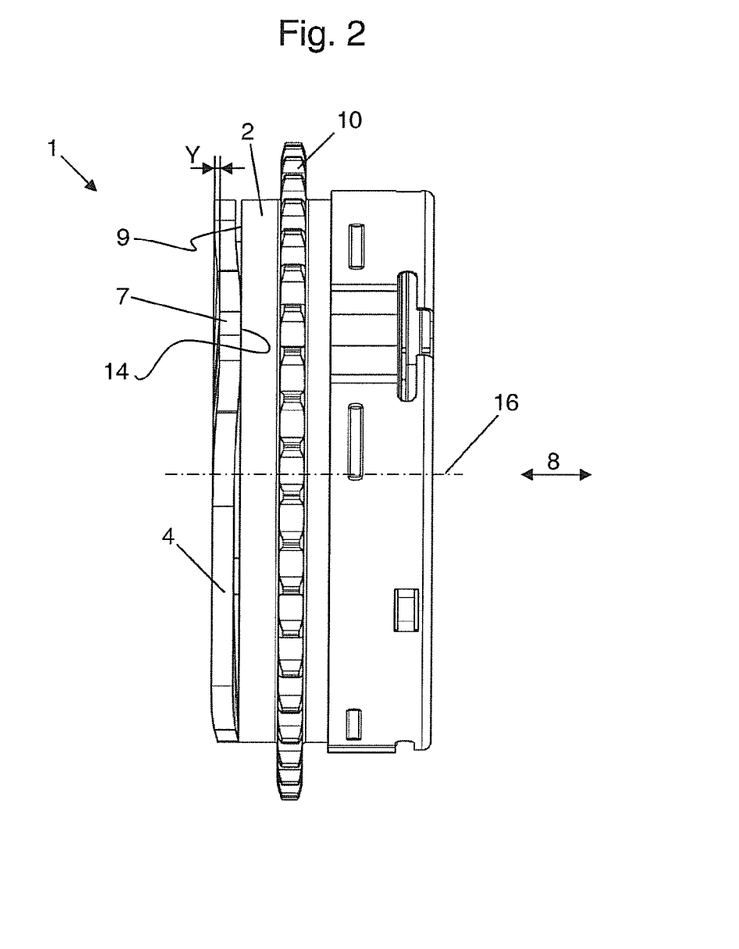
FIG. 2 shows a side view of the camshaft adjuster according to FIG. 1 with the preinstalled cover element.

FIG. 2 shows a side view of the camshaft adjuster 1 according to FIG. 1 with the preinstalled cover element 4. In this state of assembly, the cover element 4 is fixed on the input element 2 by the screws 17 to such an extent that the deformation zone 7 of the cover element 4 makes contact with the contact surface 9 of the input element 2 at the contact point 14 provided for this purpose. In this Figure, the preinstalled state of the cover element 4 and the axial offset Y of the deformation zone 7 forming part of the cover element 4 is clearly visible. The deformation zone 7 has the greatest axial offset at the position which is intended to lie opposite the contact point 14.

Figure 3:
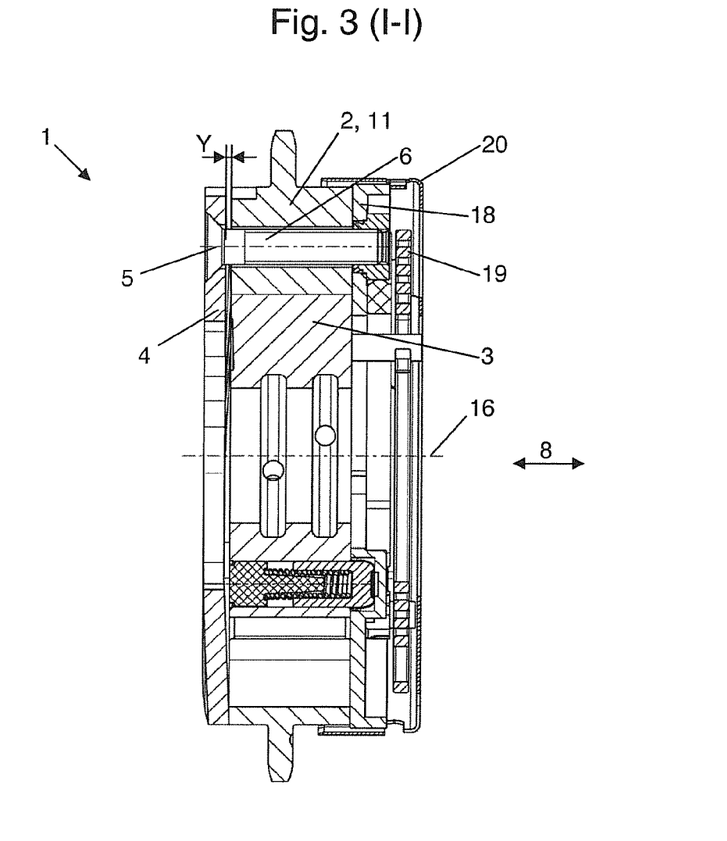
FIG. 3 shows a section along section line I-I in FIG. 1 with the preinstalled cover element.

FIG. 3 shows a section along section line I-I in FIG. 1 with the preinstalled cover element 4. The axial offset Y of the deformation zone corresponds to the gap in this state of assembly. The vane 11 is penetrated by the screw 17. The screw head of the screw 17 engages on the fastening point 5 of the cover element 4. The threaded end of the screw 17 is screwed to another cover element 18. Cover element 18 can advantageously have the same construction, in accordance with the invention, as cover element 4. In this illustrative embodiment, however, cover element 18 is designed as a locking cover known from the prior art. Adjoining cover element 18 in the axial direction 8 is a spring element 19, followed by a cover element designed as a spring cover 20.

Figure 4:
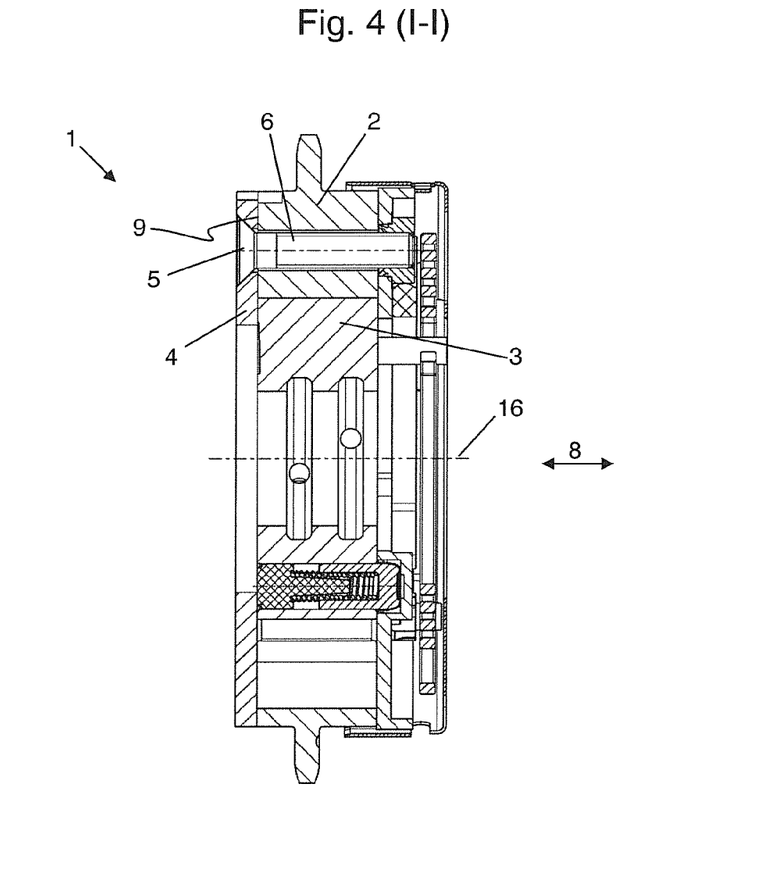
FIG. 4 shows a section along section line I-I in FIG. 1 through the camshaft adjuster after the cover element has been fully installed.
Figure 5:
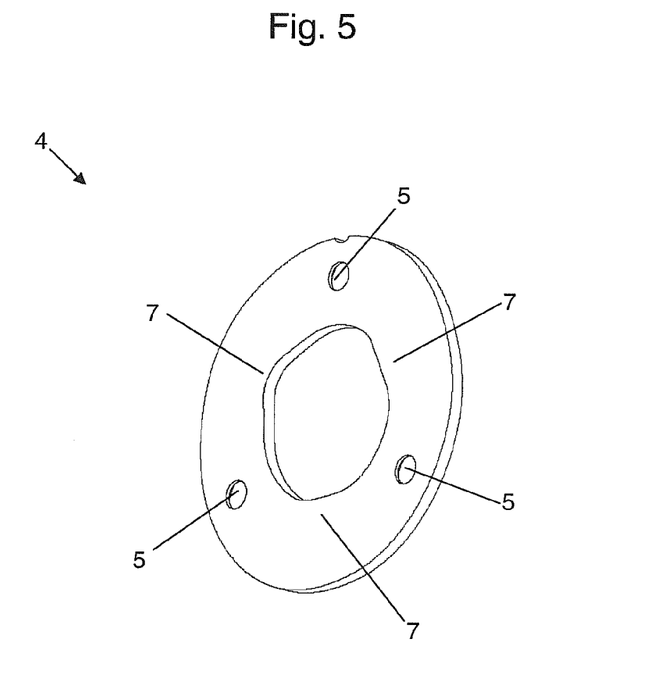
FIG. 5 shows a perspective view of the cover element according to the invention.

FIG. 4 shows a section along section line I-I in FIG. 1 through the camshaft adjuster 1 after the cover element has been fully installed. Once the screws 17 are fully tightened, the axial offset Y is eliminated, and the cover element 4 is in surface contact with the contact surface 9, in particular the sealing surface, of the input element 2. Owing to the tightening of the screws 17, cover element 4 has been deformed in such a way that there is planar, surface, sealing contact at the joints between the input element 2 and cover element 4. The deformation zones 7 of the cover element 4 are now under preload, and the preloading force thereof tends to compress the joints between cover element 4 and the input element 2. If a hydraulic fluid pressure in the working chamber A, B then acts on cover element 4, the preloading force according to the invention opposes this hydraulic fluid pressure and prevents cover element 4 from bulging out. The deformation of cover element 4 after full installation is such that the relative motion between the input element 2 and the output element 3 is not impaired.

FIG. 5 shows a perspective view of the cover element according to the invention. Cover element 4 has three fastening points 5 distributed uniformly in the circumferential direction, and has respective deformation zones 7 in the position of the angle bisector between the fastening points 5, i.e. a total of three deformation zones 7. Cover element 4 is designed as a corrugated annular washer. Advantageously, cover element 4 is manufactured so as to be initially flat, without deformation zones 7, and is provided with the pattern of holes that matches the input element 2. Cover element 4 then undergoes a forming process, preferably subject to a temperature effect, and the deformation zones 7 are formed. The fastening points 5 are designed as holes. The fastening points 5 together with the fasteners 6 preferably provided sufficient play to ensure that there is no constraint during the fitting and clamping of the cover element 4 to the input element 2 or output element 3.

LIST OF REFERENCE NUMERALS 1) camshaft adjuster
2) input element
3) output element
4) cover element
5) fastening point
6) fastener
7) deformation zone
8) axial direction
9) contact surface
10) teeth
11) vane
12) vane
13) chamber wall
14) contact point
15) chamber wall
16) axis of rotation
17) screw
18) cover element (locking cover)
19) spring element
20) spring cover
A) working chamber
B) working chamber
X) angle
Y) offset

The invention claimed is:

1. A camshaft adjuster comprising an input element and an output element, the input element and the output element are arranged to be rotatable relative to one another, and a cover element having a fastening point that is fastened at the fastening point to the input element or to the output element, using a fastener, the cover element has a deformation zone located outside the fastening point thereof and in a position at an angle bisector between fastening points, said deformation zone being deformed in so that an axial preloading force is developed between the cover element and the input element or output element fastened to the cover element.

2. The camshaft adjuster as claimed in claim 1, wherein the deformation zone is formed between a plurality of the fastening points of the cover element, which is deformed in a spring-like manner and thus produces a preloading force.

3. The camshaft adjuster as claimed in claim 1, wherein the deformation zone of the cover element is present at several points and is distributed uniformly over a circumference of the cover element.

4. The camshaft adjuster as claimed in claim 1, wherein the deformation zone is arranged around the fastening point.

5. The camshaft adjuster as claimed in claim 1, wherein the input element or the output element has a non-planar contact surface with the cover element, which deforms the cover element to generate the preloading force.

6. The camshaft adjuster as claimed in claim 1, wherein the cover element is made of sheet metal.

7. A method for assembling a camshaft adjuster as claimed in claim 1, wherein the input element and the output element are arranged to be rotatable relative to one another, the method comprising:
bringing the deformation zone into contact with the input element or the output element,
joining the cover element to the input element or output element with the fastener, resulting in deforming the deformation zone of the cover element,
the deformation zone creating a preloading force during the joining operation, and
after assembly, the deformation zone is deformed such that the cover element rests with a surface thereof against the input element or output element, and the preloading force of the deformation zone presses the cover element and the input element or output element against one another,
wherein a surface contact is maintained by the preloading force during the operation of the camshaft adjuster.

8. A cover element of a camshaft adjuster as claimed in claim 1.

9. The cover element as claimed in claim 8, wherein the cover element has a substantially constant wall thickness, and the deformation zones protrude in an axial direction in an unassembled state of the cover element.

10. The cover element as claimed in claim 8, wherein the cover element is in the form of a corrugated washer.

\* \* \* \* \*